United States Patent
Biondo et al.

(10) Patent No.: US 8,358,074 B2
(45) Date of Patent: Jan. 22, 2013

(54) DAYTIME RUNNING LAMP ACTIVATION CONTROL METHODS AND APPARATUS

(75) Inventors: William A. Biondo, Beverly Hills, MI (US); David T. Proefke, Madison Heights, MI (US); Brian K. Latouf, Rochester, MI (US); Clark E. McCall, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 554 days.

(21) Appl. No.: 12/393,749

(22) Filed: Feb. 26, 2009

(65) Prior Publication Data

US 2010/0213847 A1 Aug. 26, 2010

(51) Int. Cl.
*B60Q 1/02* (2006.01)
(52) U.S. Cl. ........ 315/82; 250/208.1; 250/340; 340/939
(58) Field of Classification Search .................. 315/82, 315/77; 250/208.1, 340, 939, 205
See application file for complete search history.

(56) References Cited

U.S. PATENT DOCUMENTS

| | | | | |
|---|---|---|---|---|
| 6,587,573 B1 * | 7/2003 | Stam et al. | ..... | 382/104 |
| 6,906,467 B2 * | 6/2005 | Stam et al. | ..... | 315/82 |

* cited by examiner

*Primary Examiner* — Daniel D Chang
(74) *Attorney, Agent, or Firm* — Ingrassia Fisher & Lorenz, P.C.

(57) ABSTRACT

Embodiments include lighting systems and methods for controlling the activation of daytime running lamps (DRLs). Embodiments of the method include receiving inputs from one or more on-board subsystems, and when the lighting system is set in an automatic control mode and the headlights are deactivated, selectively activating and deactivating the DRLs based on the inputs. Embodiments of the lighting system include DRLs, headlights, and a processing and control subsystem. The processing and control subsystem is adapted to determine whether a DRL activation criteria is met when the lighting system is set in an automatic control mode, to activate the DRLs when the DRL activation criteria is met and the headlights are deactivated, and to deactivate the DRLs when the DRL activation criteria is not met and the headlights are deactivated.

14 Claims, 2 Drawing Sheets

DAYTIME RUNNING LAMP ACTIVATION CONTROL METHODS AND APPARATUS

TECHNICAL FIELD

Embodiments of systems and methods relate to lighting control systems in motor vehicles, and more particularly to daytime running lamp control systems and methods of their operation.

BACKGROUND

A typical motor vehicle includes several light producing elements that are adapted to provide exterior illumination and/or to increase the visibility of the vehicle to others. These light producing elements include, for example, headlights, taillights, and daytime running lamps. A typical vehicle's lighting system includes these and other light producing elements, a lighting controller, an ambient light sensor, and a user interface. The lighting controller is adapted to cause the light producing elements to turn on and off (e.g., to put the light producing elements in an activated state (on) or a deactivated state (off)).

The user interface of the lighting system (e.g., a multi-setting knob on the dashboard or on the turn signal lever) typically includes settings that allow a user manually to turn the headlights on and off, and also that allow the user to set the lighting system into an automatic control mode. While in the automatic control mode, the lighting controller automatically determines when to activate or deactivate the headlights based on the ambient light conditions of the exterior surroundings. The ambient light conditions may be detected by the ambient light sensor, which provides information regarding the ambient light conditions to the lighting controller.

The daytime running lamps (DRLs) may be controlled in coordination with the headlights, and the DRLs may make it easier for others to notice the vehicle at times when the headlights are in a deactivated state. In some vehicles, the DRLs are distinct light producing elements from the headlights. In other vehicles, the headlights may be considered to be DRLs when they are operated at a reduced intensity level from the normal headlight intensity level. While the lighting system is set in the automatic control mode, the DRLs may be activated (or the intensity of the headlights may be reduced to the DRL intensity level) at times when the headlights are in a deactivated state. Alternatively, the DRLs may be deactivated (or the intensity of the headlights may be increased to the normal headlight intensity level) at times when the headlights are in an activated state.

DRLs tend to be the most effective as a safety device during low ambient light conditions, such as at dawn, at dusk, and when the vehicle is in dark shadow or darkness (e.g., in a tunnel or parking structure). When the vehicle is in bright ambient light conditions and, thus, is more highly visible, the safety benefits of the DRLs are less likely to be realized. However, as long as the lighting system is set in the automatic control mode, the DRLs will remain activated in such bright ambient light conditions (i.e., when the headlights are deactivated). Thus, even when their safety benefits are less likely to be realized, the DRLs continue to consume on-board electrical power. The power consumption of the DRLs may decrease the vehicle's fuel economy.

Societal trends are moving toward more energy-efficient products in many product sectors, with a particular emphasis on producing more energy-efficient motor vehicles (e.g., motor vehicles with improved fuel economy). Accordingly, what are needed are more energy-efficient, motor vehicle lighting systems and methods for their operation. Other desirable features and characteristics will become apparent from the subsequent detailed description and the appended claims, taken in conjunction with the accompanying drawings and the foregoing technical field and background.

SUMMARY

An embodiment includes a method performed by a lighting system of a motor vehicle for controlling the activation of daytime running lamps (DRLs). The method comprising the steps of receiving inputs from one or more on-board subsystems, and when the lighting system is set in an automatic control mode and when headlights of the motor vehicle are deactivated, selectively activating and deactivating the DRLs based on the inputs. According to a further embodiment, selectively activating and deactivating the DRLs comprises determining whether a DRL activation criteria is met, deactivating the DRLs when the DRL activation criteria is not met, and activating the DRLs when the DRL activation criteria is met. In yet a further embodiment, the DRL activation criteria is met when it is determined that one or more events has occurred, which include at least one event selected from a group that includes an ambient light level having fallen below a DRL activation threshold, the motor vehicle approaching or having arrived at a low-light feature, the motor vehicle approaching or having arrived at a high-traffic feature, the motor vehicle approaching or having arrived at a portion of a route with decreased visibility, a determination that windshield wipers of the motor vehicle are activated, and a determination that another vehicle is located in proximity to the motor vehicle.

Another embodiment of a method for controlling the activation of DRLs comprises the steps of determining whether a DRL activation criteria is met when the lighting system is set in an automatic control mode, when the DRL activation criteria is met and headlights of the motor vehicle are deactivated, activating the DRLs, and when the DRL activation criteria is not met and headlights of the motor vehicle are deactivated, deactivating the DRLs.

An embodiment of a lighting system of a motor vehicle comprises DRLs, headlights, and a processing and control subsystem. The processing and control subsystem is adapted to determine whether a DRL activation criteria is met when the lighting system is set in an automatic control mode, to activate the DRLs when the DRL activation criteria is met and the headlights are deactivated, and to deactivate the DRLs when the DRL activation criteria is not met and the headlights are deactivated.

BRIEF DESCRIPTION OF THE DRAWINGS

Embodiments of the inventive subject matter will hereinafter be described in conjunction with the following drawing figures, wherein like numerals denote like elements.

DETAILED DESCRIPTION

The following detailed description is merely exemplary in nature and is not intended to limit the scope or the application and uses of the inventive subject matter. Furthermore, there is no intention to be bound by any expressed or implied theory presented in the preceding technical field, background, summary or the following detailed description.

Embodiments of the inventive subject matter include motor vehicle lighting systems and methods for controlling the activation and deactivation of daytime running lamps. While maintaining the safety benefits of daytime running lamps, the systems and methods of the various embodiments may be more energy-efficient than traditional motor vehicle lighting systems and methods for their operation, by decreasing consumption of on-board electrical power by the daytime running lamps. Accordingly, embodiments of the inventive subject matter may result in increased fuel economy in motor vehicles.

Figure 1:
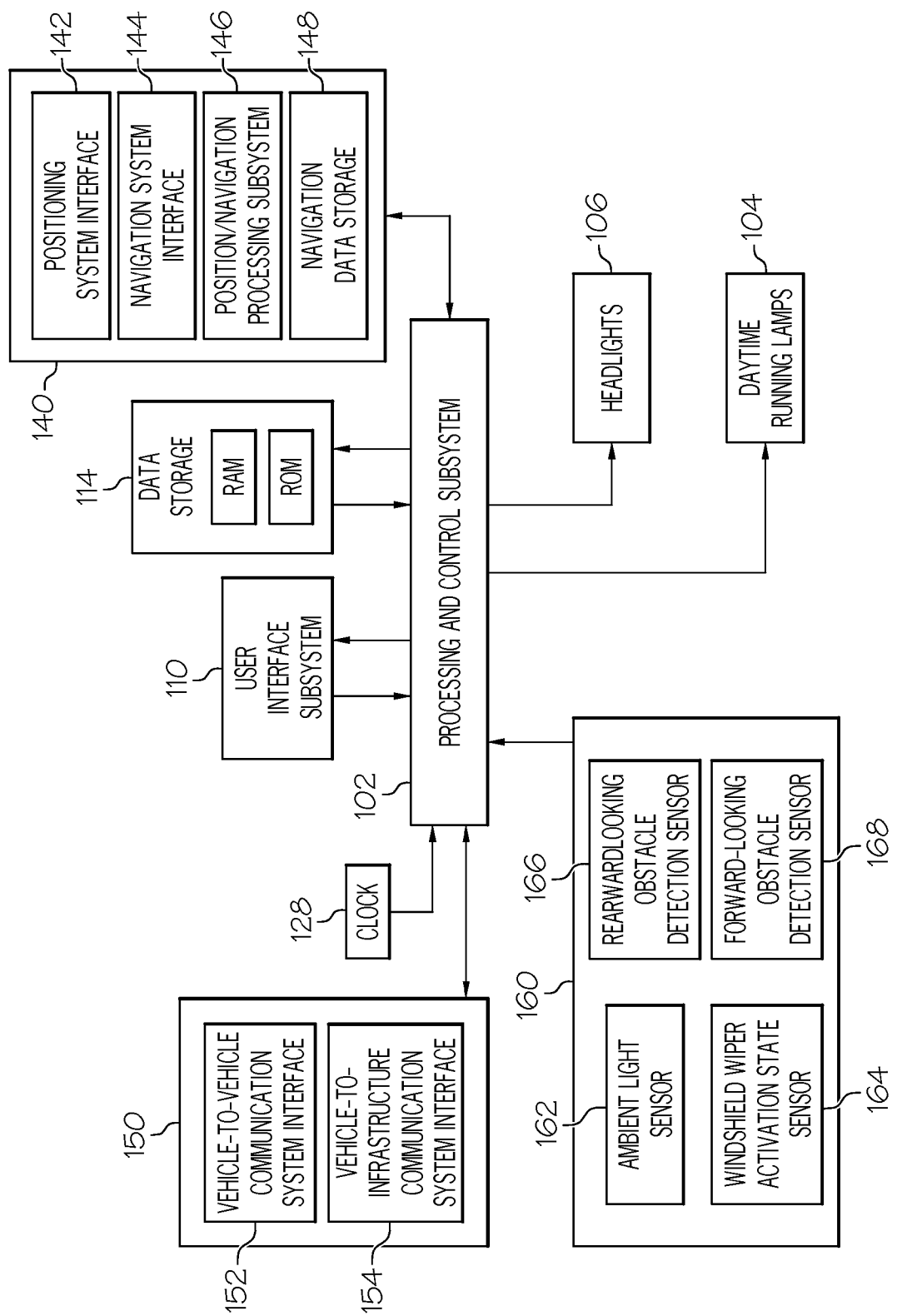
FIG. 1 is a simplified block diagram of portions of a lighting system and other components of a motor vehicle that may be used in conjunction with controlling the activation and deactivation of daytime running lamps, in accordance with an example embodiment.

FIG. 1 is a simplified block diagram of portions of a lighting system and other components of a motor vehicle that may be used in conjunction with controlling the activation and deactivation of daytime running lamps, in accordance with an example embodiment. A motor vehicle into which the lighting system may be incorporated may be any one of a number of different types of motor vehicles, including, for example, a conventional type of motor vehicle that includes an internal combustion engine (e.g., a gasoline or diesel fueled combustion engine, a gasoline/alcohol ("flex fuel") combustion engine, or a gaseous compound (e.g., hydrogen and natural gas) fueled engine), a hybrid-electric vehicle (e.g., a vehicle that includes an internal combustion engine and an electric motor to provide propulsion), or an all-electric vehicle (e.g., a vehicle that includes only an electric motor to provide propulsion). Although a motor vehicle will include various subsystems associated with propelling the vehicle (e.g., engine, motor, transmission system, braking system, electrical system, and so on, not illustrated), these subsystems are not illustrated in FIG. 1 in order to more clearly focus the description, below, on the various embodiments.

The motor vehicle's lighting system includes processing and control subsystem 102, daytime running lamps 104 (DRLs), and headlights 106. DRLs 104 and headlights 106 are located on the exterior of the motor vehicle. As used herein, the terms "daytime running lamps" and "DRLs" mean either: 1) one or more light producing elements that are distinct from the headlights 106; or 2) one or more light producing elements that have multiple light intensity levels, where a first light intensity level (e.g., a "headlight intensity level") is a relatively high intensity level, and a second light intensity level (e.g., a "DRL intensity level") is a relatively low intensity level, when compared with the headlight intensity level. According to the latter embodiment, DRLs 104 and headlights 106 may include the same light producing elements (e.g., DRLs 104 and headlights 106 are integral with each other).

According to an embodiment, the activation and deactivation of DRLs 104 and headlights 106 are controlled by signals produced by processing and control subsystem 102. Processing and control subsystem 102 may include one or more automotive control modules, electronic control units, general-purpose and/or special-purpose processors, and/or associated electronics. As will be described in more detail below, when the lighting system is set in an automatic control mode, processing and control subsystem 102 may selectively activate and deactivate DRLs 104 based on inputs from one or more on-board subsystems, which include clock 128, position/navigation system 140, wireless interfaces 150, and/or on-board sensors 160, according to an embodiment. Inputs from clock 128, position/navigation system 140, wireless interfaces 150, and on-board sensors 160 may be referred to as "non-conventional" inputs, herein, because such inputs are not considered in the determination of DRL 104 activation and deactivation in traditional lighting systems.

User interface subsystem 110 may include one or more knobs, dials, buttons, levers, display devices, and/or other apparatus. To focus the description to the various embodiments, only aspects of the user interface subsystem 110 that relate to the lighting system will be discussed herein. Via the various apparatus of the user interface subsystem 110, user interface subsystem 110 is adapted to receive inputs from the operator of the motor vehicle (e.g., the driver), which indicate the driver's desire to manually activate the DRLs 104 or the headlights 106, to manually deactivate the DRLs 104 or the headlights 106, or to set the lighting system in an automatic control mode. The lighting system may provide a single automatic control mode, in an embodiment, which corresponds to embodiments of the inventive subject matter discussed herein. In an alternate embodiment, the lighting system may provide an additional automatic control mode, which corresponds to a conventional automatic lighting control method. In the latter embodiment, user interface subsystem 110 may have a manual off setting, a manual on setting, a first automatic control mode setting (e.g., corresponding to an embodiment), and a second automatic control mode setting (e.g., corresponding to a conventional automatic lighting control method). User interface subsystem 110 provides signals to processing and control subsystem 102, which indicate the manual or automatic settings of the lighting system.

Clock 128 includes an analog or digital device adapted to maintain and/or to determine knowledge of a current time and date, and to provide information defining the current time and date to the processing and control subsystem 102. Clock 128 may be a self-contained clock having a current date and time that may be settable by a user, or clock 128 may acquire knowledge of a current time and date from an external source (e.g., GPS, a cellular telephone system, or some other external source). As will be described in more detail later, the information produced by clock 128 may be used by processing and control system 102 in conjunction with determining whether to activate or deactivate the DRLs 104, according to an embodiment.

Figure 2:
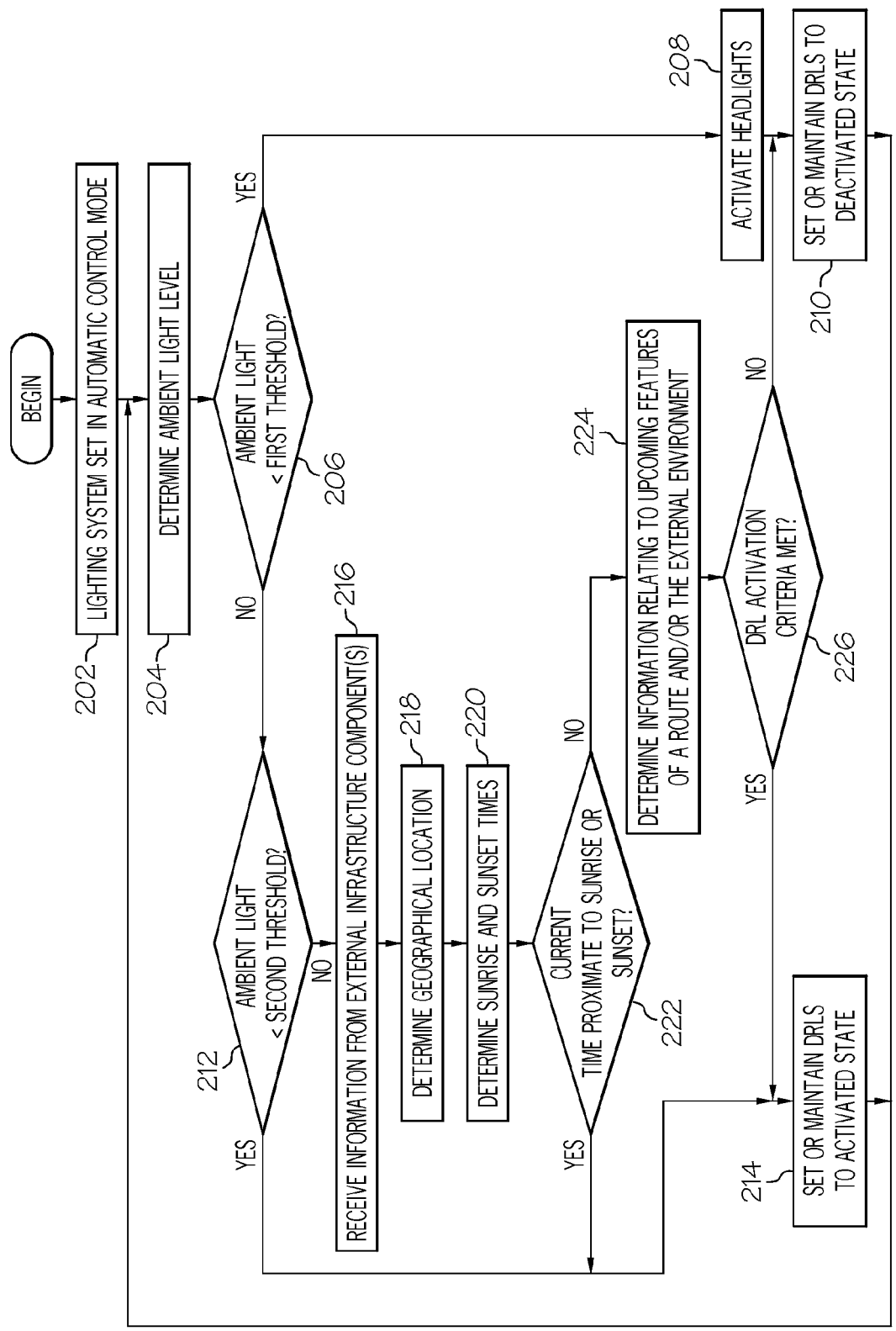
FIG. 2 is a flowchart of a method for controlling the activation and deactivation of daytime running lamps in a motor vehicle, in accordance with an embodiment.

Data storage 114 may include various types of random access memory (RAM) and read only memory (ROM), which are adapted to store computer-readable instructions (e.g., program code) associated with one or more lighting control procedures (e.g., program code adapted to implement embodiments of the method of FIG. 2), variable data (e.g., geographical location information, weather information, ambient light information, navigation information, and so on), and persistent data, among other things. The instructions may be fetched and executed by processing and control subsystem 102, and the data also may be used by processing and control subsystem 102 in conjunction with performing a lighting control procedure. According to an embodiment, data storage 114 may include one or more registers, which are designated for storing information indicating the current activation status of headlights 106 and DRLs 104 (e.g., a headlight state register in and a DRL state register). In an alternate embodiment, information indicating the activation status of the headlights 106 and DRLs 104 may be stored elsewhere (e.g., in an internal register or storage location of processing and control subsystem 102). In addition, processing and control subsystem 102 and/or other system components may store various types of data in data storage 114.

Position/navigation system 140 is adapted to provide the functions of position determination (e.g., determining the geographical location of the motor vehicle) and navigation, according to an embodiment. According to other embodiments, position/navigation system 140 may provide only position determination or navigation, but not both. In still other embodiments, the vehicle may include separate subsystems to perform position determination and navigation. Position/navigation system 140 includes a positioning system interface 142, a navigation system interface 144, a position/navigation processing subsystem 146, and navigation data storage 148, according to an embodiment.

Positioning system interface 142 includes one or more antennas and receivers adapted to receive signals from at least one external infrastructure component of a positioning system that is external to the motor vehicle. According to an embodiment, the external infrastructure component may be a global positioning system (GPS) satellite (not illustrated), and accordingly positioning system interface 142 may be adapted to receive signals transmitted by one or more GPS satellites that may be used for the purpose of location determination. According to other embodiments, positioning system interface 142 may be adapted to receive signals from other types of terrestrial-based external infrastructure components, such as cellular telephone base stations or other terrestrial-based transmitters. As will be described in more detail below, the signals may be processed by position/navigation processing subsystem 146 in order to determine a geographical location of the motor vehicle. In addition, received signals may include information specifying a current time (e.g., a GPS time) and date, among other things.

Navigation system interface 144 is a wireless interface that includes one or more antennas and transceivers adapted to transmit signals to and receive signals from at least one navigation system that is external to the motor vehicle. According to an embodiment, transmitted signals may convey messages generated by position/navigation processing subsystem 146 relating to requests for navigation information (e.g., destination addresses, origination addresses, position information, search parameters, route determination parameters, and so on), and received signals may convey messages generated by the external navigation system in response to the requests or otherwise initiated by the external navigation system (e.g., maps, routes, address information, potential destination information, topographical information, information relating to the physical features of a roadway, information relating to traffic control devices and/or posted speed limits, information relating to transient anomalies, and so on). Position/navigation processing subsystem 146 may use some of the received signals in order to convey route information (e.g., via a display) to the driver. In addition, and as will be described in more detail below, position/navigation processing subsystem 146 and/or processing and control subsystem 102 may process the signals or information conveyed therein in conjunction with determining whether to activate or deactivate the DRLs 104, according to an embodiment.

Position/navigation processing subsystem 146 may be distinct from processing and control subsystem 102, according to an embodiment, although it may be integrally part of the processing and control subsystem 102, according to another embodiment. Position/navigation processing subsystem 146 may include one or more general-purpose and/or special-purpose processors, and/or associated electronics, and is adapted to analyze the signals received by positioning system interface 142 in order to determine a geographical location of the motor vehicle. According to an embodiment, geographical location determination is performed using a geometric trilateration technique, although other methods for determining a geographical location may be used, in other embodiments. Location determination using geometric trilateration is most accurately achieved when signals from three or more, spatially-separated external infrastructure components (e.g., three or more distinct GPS satellites) are receivable. However, the term "geometric trilateration technique" as used herein may also include performing location determination when signals from one or two external infrastructure components are available.

Navigation data storage 148 may be distinct from data storage 114, according to an embodiment, although some or all of navigation data storage 148 may be integrally part of data storage 114, according to another embodiment. Navigation data storage 148 may include various types of RAM and/or ROM, which are adapted to store information relating to features of a route which the motor vehicle is or may be following and potential source locations and destination locations. This information may include, for example, information defining roadways (e.g., geographical locations of roadways), geographical boundaries, geographical entity names (e.g., state, city, street, street address), and/or business entity names, contact information, and entity type, among other things. In addition, according to various embodiments, navigation data storage 148 also or alternatively may store one or more other types of information, including navigational information indicating geographical locations and features of proximate topography (e.g., elevations, elevation contours, landforms, and so on), geographical locations and characteristics of low-light navigational features (e.g., tunnels, parking garages, stacked roadways, overpasses, and so on), physical features of a roadway or route (e.g., grades, lane configurations, and so on), and current weather related information (e.g., precipitation, fog, cloud cover, and so on), among other things. Some or all of this information alternatively may be stored elsewhere (e.g., in the RAM of data storage 114 or in an external location). According to an embodiment, navigation data storage 148 also may be adapted to store computer-readable instructions (e.g., program code) associated with the functions performed by position/navigation processing subsystem 146.

Wireless interfaces 150 include one or more interfaces adapted to communicate wirelessly with systems that are external to the motor vehicle (other than a navigation system or positioning system). According to various embodiments, wireless interfaces 150 may include one or more interfaces selected from a group that includes a vehicle-to-vehicle communication system interface 152 and a vehicle-to-infrastructure communication system interface 154.

Vehicle-to-vehicle communication system interface 152 includes one or more antennas and transceivers adapted to transmit signals to and receive signals from one or more other motor vehicles proximate to the motor vehicle. According to an embodiment, transmitted signals may convey messages generated by processing and control subsystem 102 and/or position/navigation processing subsystem 146 relating to the motor vehicle's geographical location, current speed, target speed, direction of motion, and so on. In addition, transmitted signals may convey messages relating to requests for information from the other vehicle (e.g., the other vehicle's geographical location, current speed, target speed, direction of motion, and so on). Received signals may convey messages generated by the other vehicle in response to the requests or otherwise initiated by the other vehicle (e.g., the other vehicle's geographical location, current speed, target speed, direction of motion, and so on). According to an embodiment, and as described in more detail below, processing and control subsystem 102 may process the received signals or information conveyed therein in conjunction with determining whether to activate or deactivate the DRLs 104.

Vehicle-to-infrastructure communication system interface 154 includes one or more antennas and transceivers adapted to transmit signals to and receive signals from one or more external communication systems (e.g., cellular telephone systems, radio networks, satellite communication systems, and so on). According to an embodiment, transmitted signals may convey messages generated by processing and control subsystem 102 and/or position/navigation processing subsystem 146 relating to requests for information from the external communication system (e.g., information regarding transient anomalies, almanac information, information accessible over the internet, and other information). Received signals may convey messages generated by the external communication system in response to the requests or otherwise initiated by the external communication system. According to a particular embodiment, received signals may convey information regarding the geographical positions of wireless devices that may be carried, for example, by pedestrians. According to an embodiment, and as described in more detail below, processing and control subsystem 102 may process the received signals or information conveyed therein in conjunction with determining whether to activate or deactivate the DRLs 104.

According to an embodiment, a motor vehicle also may include a person-to-vehicle communication system interface (not illustrated), which includes one or more antennas and transceivers adapted to transmit signals to and/or to receive signals from a portable wireless device that may be carried by a person (e.g., a pedestrian). According to an embodiment, received signals may convey messages generated by the portable wireless device in response to the requests or otherwise initiated by the portable wireless device (e.g., the device's geographical location). According to an embodiment, and as described in more detail below, processing and control subsystem 102 may process the received signals or information conveyed therein in conjunction with determining whether to activate or deactivate the DRLs 104.

On-board sensors 160 include one or more sensors adapted to provide information to the processing and control subsystem 102 relating to the external environment and/or the state of a system or device of the motor vehicle. According to various embodiments, on-board sensors 160 may include one or more sensors selected from a group that includes an ambient light sensor 162, a rearward-looking obstacle detection sensor 166, a forward-looking obstacle detection sensor 168, and a windshield wiper activation state sensor 164.

Ambient light sensor 162 is adapted to detect an ambient light level of the environment external to the motor vehicle, and to provide information defining the detected ambient light level to the processing and control subsystem 102. More particularly, ambient light sensor 162 may include a light detection component positioned on or near an exterior of the motor vehicle that is adapted to detect the level of ambient light of the environment external to the vehicle, and to generate information defining the detected level of ambient light. The sensitivity of ambient light sensor 162 may be adjustable, according to an embodiment. As will be described in more detail later, the information produced by ambient light sensor 162 may be used by processing and control system 102 in conjunction with determining whether to activate or deactivate the DRLs 104, according to an embodiment.

Windshield wiper activation state sensor 164 is adapted to determine the activation state of the motor vehicle's windshield wiper motors, and to generate information indicating the determined activation state. As will be described in more detail later, the information produced by windshield wiper activation state sensor 164 may be used by processing and control system 102 in conjunction with determining whether to activate or deactivate the DRLs 104, according to an embodiment.

Rearward-looking obstacle detection sensor 166 and forward-looking obstacle detection sensor 168 are adapted to detect the presence of obstacles behind and in front of the motor vehicle, respectively, and also to detect the distance between the motor vehicle and the detected obstacle. Obstacles may include, for example, other motor vehicles and pedestrians, for example. Rearward-looking obstacle detection sensor 166 and forward-looking obstacle detection sensor 168 also may be adapted to determine the relative velocity of an obstacle (e.g., another vehicle or a pedestrian) with respect to the motor vehicle. Rearward-looking obstacle detection sensor 166 and forward-looking obstacle detection sensor 168 are also adapted to provide information indicating the presence of obstacles, the distances to the detected obstacles, and/or the relative velocity of the obstacles to the processing and control subsystem 102. As will be described in more detail later, the information produced by the rearward-looking obstacle detection sensor 166 and/or the forward-looking obstacle detection sensor 168 may be used by processing and control system 102 in conjunction with determining whether to activate or deactivate the DRLs 104, according to an embodiment.

FIG. 2 is a flowchart of a method for controlling the activation and deactivation of DRLs in a motor vehicle, in accordance with an embodiment. Embodiments of the method of FIG. 2 may be performed, for example, substantially by a processing and control subsystem of the motor vehicle (e.g., processing and control subsystem 102, FIG. 1). In the embodiment described in conjunction with FIG. 2, and as will be described in more detail below, the method includes considering non-conventional inputs in conjunction with determining whether to activate or deactivate the DRLs (e.g., DRLs 104, FIG. 1).

The method may begin, in block 202, when the lighting system has been set in an automatic control mode. According to an embodiment, a user interface subsystem (e.g., user interface subsystem 110, FIG. 1) may indicate that the lighting system has been set in an automatic control mode in response to the manipulation, by the driver, of one or more apparatus associated with the user interface subsystem. For example, but not by way of limitation, the driver may turn a dial (or otherwise manipulate a user interface apparatus) to a setting associated with the automatic control mode. As mentioned previously, the lighting system may provide a single automatic control mode (e.g., corresponding to embodiments of the inventive subject matter) or the lighting system may provide multiple automatic control modes (e.g., a first mode corresponding to the embodiments, and an additional automatic control mode corresponding to a conventional automatic lighting control method). In order to focus the description on the various embodiments, a conventional automatic lighting control method is not discussed in detail herein.

In block 204, the ambient light level may be determined. According to an embodiment, ambient light levels (e.g., light conditions present in the external environment) are determined based on information provided by an ambient light sensor (e.g., ambient light sensor 162, FIG. 1). The ambient light sensor may produce an analog or digital value that represents the intensity or level of the ambient light.

In block 206, a determination may be made, based on the ambient light intensity information, whether the ambient light intensity is above or has fallen below a first ambient light threshold, referred to herein as a "headlight activation threshold". According to an embodiment, the headlight activation threshold corresponds to an ambient light intensity below which the headlights (e.g., headlights 106, FIG. 1) should be activated, and above which the headlights should be deactivated.

When the ambient light intensity is below the headlight activation threshold, then in block 208, the headlights are set to an activated state, or if they already are in an activated state, then the activated state setting is maintained. According to an embodiment, this may include the lighting system (e.g., processing and control subsystem 102, FIG. 1) making a determination of whether or not the headlights currently are in an activated state (e.g., by evaluating information in a headlight state register in data storage 114, FIG. 1). When a determination is made that the headlights currently are in an activated state, the lighting system may take no action. When a determination is made that the headlights currently are in a deactivated state, the lighting system may send a control signal to the headlights to activate the headlights, and may store an indication of the activation status (e.g., in a headlight state register in data storage 114, FIG. 1).

In block 210, the DRLs are set to a deactivated state, or if they already are in a deactivated state, then the deactivated state setting is maintained. According to an embodiment, this may include the lighting system (e.g., processing and control subsystem 102, FIG. 1) making a determination of whether or not the DRLs currently are in a deactivated state (e.g., by evaluating information in a DRL state register in data storage 114, FIG. 1). When a determination is made that the DRLs currently are in a deactivated state, the lighting system may take no action. When a determination is made that the DRLs currently are in an activated state, the lighting system may send a control signal to the DRLs to deactivate the DRLs, and may store an indication of the deactivation status (e.g., in a DRL state register in data storage 114, FIG. 1). The method may then iterate as shown in FIG. 2.

Referring back to block 206, when the ambient light intensity is above the headlight activation threshold, then in block 212, a determination may be made, based on the ambient light intensity information, whether the ambient light intensity is above or has fallen below a second ambient light threshold, referred to herein as a "DRL activation threshold". According to an embodiment, the DRL activation threshold corresponds to an ambient light intensity below which the DRLs (e.g., DRLs 104, FIG. 1) should be activated (unless the headlights are activated), and above which the DRLs should be deactivated. An ambient light level having fallen below the DRL activation threshold may be considered a "DRL activation criteria," which will be described in more detail in conjunction with block 226, later.

According to an embodiment, the DRL activation threshold corresponds to an ambient light intensity that is higher than the ambient light intensity associated with the headlight activation threshold. According to another embodiment, the headlight activation threshold and the DRL activation threshold may be equal, or block 212 may be excluded altogether (e.g., when the ambient light intensity is below the headlight activation threshold, the method may proceed directly from block 206 to block 216, described later).

In an embodiment in which the DRL activation threshold is higher than the headlight activation threshold, certain types of lighting conditions may correspond to ambient light intensities that fall between the DRL activation threshold and the headlight activation threshold. For example, these lighting conditions may be present in shadowy areas (e.g., areas having shadows from vegetation, terrain, buildings, bridges, tunnels or other objects). When the motor vehicle moves into such an area, the ambient light sensor (e.g., ambient light sensor 162) may produce information indicating the relatively-low light intensity level (i.e., the light intensity level between the DRL activation threshold and the headlight activation threshold).

Referring again to block 212, when the ambient light intensity is below the DRL activation threshold (and above the headlight activation threshold), then in block 214, the DRLs are set to an activated state, or if they already are in an activated state, then the activated state setting is maintained. According to an embodiment, this may include the lighting system (e.g., processing and control subsystem 102, FIG. 1) making a determination of whether or not the DRLs currently are in an activated state (e.g., by evaluating information in a DRL state register in data storage 114, FIG. 1). When a determination is made that the DRLs currently are in an activated state, the lighting system may take no action. When a determination is made that the DRLs currently are in a deactivated state, the lighting system may send a control signal to the DRLs to activate the DRLs, and may store an indication of the activation status (e.g., in a DRL state register in data storage 114, FIG. 1). The method may then iterate as shown in FIG. 2.

Referring again to block 212, when the ambient light intensity is above the DRL activation threshold, then in block 216, information may be received from one or more external infrastructure components. The information may include signals that are received by a receiver of a positioning system interface (e.g., positioning system interface 142, FIG. 1), for example. The received signals enable a position processing subsystem (e.g., position/navigation processing subsystem 146 or processing and control subsystem 102, FIG. 1) to determine a geographical location of the motor vehicle, as will be described in more detail below. According to an embodiment, the one or more external infrastructure components include at least one global positioning system satellite, and the signals include microwave signals transmitted by transmitters of the global positioning system satellite(s). The transmitted signals may include messages indicating the times when the signals were transmitted and orbital information (e.g., an ephemeris), among other things. In an alternate embodiment, the one or more external infrastructure components include at least one terrestrial-based infrastructure component (e.g., a cellular telephone base station or other fixed-position transmitter), and the signals include microwave signals transmitted by transmitters of the terrestrial-based infrastructure component. These signals may include messages indicating the times when the signals were transmitted and position information indicating coordinates of the transmitter's position.

In block 218, the geographical location of the motor vehicle may be determined based on the received signals. This determination may be made, for example, by a position processing subsystem (e.g., position/navigation processing subsystem 146, FIG. 1). According to an embodiment, geometric trilateration is used to determine the geographical location. In such an embodiment, a distance may be determined between the location of the motor vehicle (or more particularly, the positioning system interface 142) and the positions of each of the external infrastructure components from which the motor vehicle received signals. According to an embodiment, the position processing system maintains a clock that is synchronized with the clocks of the external infrastructure components. Each distance may be determined, for example, by measuring the transit time of each message and computing the distance to each external infrastructure component (e.g., each satellite). The geographical location of the motor vehicle may then be determined by combining the distances with the location of the external infrastructure components (e.g., the satellites) to determine the geographical location of the motor vehicle (or more particularly, the location of the positioning system interface receiver). In alternate embodiments, methods other than geometric trilateration may be used to determine the geographical location. For example, but not by way of limitation, the geographical location may be determined using a multilateration technique, a triangulation technique, or another position-determination technique.

In block 220, sunrise and sunset times may be determined, according to an embodiment. In an embodiment, the determination may be made within the main control loop, as shown. In another embodiment, this determination may be made only once per day (or less often), and accordingly the determination may be performed outside the main control loop of the method of FIG. 2 (e.g., the loop that includes blocks 204-226). In yet another embodiment, the determination (and its related determination in block 222) may be excluded from the method altogether.

When performed, determining the sunrise and sunset times may be performed by determining the current date (e.g., from clock 128, position/navigation system 140, wireless interfaces 150, FIG. 1, or other sources), determining the geographical location of the motor vehicle (e.g., in block 218), and accessing almanac data that correlates dates, geographical areas, and sunrise and sunset times. The almanac data may be accessed from on-board data storage (e.g., data storage 114, FIG. 1) or it may be accessed from a remote source (e.g., the Internet or some other remote data source) via wireless communication (e.g., using wireless interfaces 150, FIG. 1).

As used herein, the term "sunrise time" means a time that is determined to correspond with the end of dawn, and the term "sunset time" means a time that is determined to correspond with the beginning of dusk. According to an embodiment, the system may determine the sunrise time and the sunset time to be the same as the sunrise time and the sunset time specified by the almanac data. According to an alternate embodiment, the system may determine the sunrise time and the sunset time to be offset by some pre-defined increments from the sunrise time and/or the sunset time specified by the almanac data. According to a particular embodiment, the sunrise time is determined to correspond with a time when the sun is predicted to rise above a theoretical horizon line (i.e., the end of dawn), and the sunset time is determined to correspond with a time when the sun is predicted to set below a theoretical horizon line (i.e., the beginning of dusk). In other embodiments, the sunrise time may be determined to correspond with some time before or after the sun is predicted to rise, and/or the sunset time may be determined to correspond with some time before or after the sun is predicted to set. Either way, the period of time between the sunrise time and the sunset time may be referred to herein as "day," and the period of time between the sunset time and the sunrise time may be referred to herein as "night."

In block 222, a determination may be made whether the current time is "temporally proximate to" the sunrise time or the sunset time, where the term "temporally proximate to" means within a relatively short time period before (e.g., within 0 to 30 minutes before) and/or a relatively short time period after (e.g., within 0 to 30 minutes after). The current time being temporally proximate to the sunrise time or the sunset time may be considered a "DRL activation criteria," which will be described in more detail in conjunction with block 226, later.

According to an embodiment, determining whether the current time is temporally proximate to the sunrise or sunset times may include the lighting system (e.g., processing and control subsystem 102, FIG. 1) determining the current time, and comparing a current time to a first time range that is temporally proximate to the sunrise time, and to a second time range that is temporally proximate to the sunset time. The current time value may be obtained from the on-board clock (e.g., clock 128, FIG. 1) or it may be obtained from an external source (e.g., a clock obtained from position/navigation system 140, wireless interfaces 150, FIG. 1, or another source). According to an example embodiment, the first time range may span from a first time (e.g., a time that is about 30 minutes before the sunrise time) to a second time (e.g., a time that is about 30 minutes after the sunrise time), and the second time range may span from a third time (e.g., a time that is about 30 minutes before the sunset time) to a fourth time (e.g., a time that is about 30 minutes after the sunset time), according to an embodiment. In other embodiments, the first and second time ranges may be wider or narrower than the above given ranges, and/or the time ranges may be asymmetrically arranged around the sunrise and sunset times.

When the current time falls within the first or second time range, the determination may be made that the current time is temporally proximate to the sunrise time or the sunset time. In this case, the DRLs are set to an activated state, or if they already are in an activated state, then the activated state setting is maintained as described above in conjunction with the description of block 214. The method may then iterate as shown in FIG. 2.

Referring back to block 222, when the current time does not fall within the first or second time range, the determination may be made that the current time is not temporally proximate to the sunrise time or the sunset time. In this case, then in block 224, information relating to upcoming features of a route which the motor vehicle is following and/or features of an environment external to the motor vehicle may be received and/or retrieved (e.g., by processing and control subsystem 102, FIG. 1), according to an embodiment. Retrieved information may be retrieved from local memory (e.g., from data storage 114 or from navigation data storage 148, FIG. 1) or from an external source. External sources may include, for example, the internet, other networks, and/or other vehicles. Information from the internet or other networks may be retrieved using a vehicle-to-infrastructure communication system interface (e.g., vehicle-to-infrastructure communication system interface 154, FIG. 1), and/or a navigation system interface (e.g., navigation system interface 144, FIG. 1), according to various embodiments. In addition or alternatively, information from other vehicles may be received or retrieved using a vehicle-to-vehicle communication system interface (e.g., vehicle-to-vehicle communication system interface 152, FIG. 1), and/or information from portable wireless devices may be retrieved using a person-to-vehicle communication system interface (not illustrated).

In an embodiment, information relating to features of a route may include features of a previously planned route or other potential routes that are proximate to the motor vehicle's location. More particularly, this information may include, but is not limited to, one or more types of information selected from a group that includes information relating to a feature's type (e.g., tunnel, parking garage, overpass, stacked roadway, traffic control device, and so on), features of proximate topography, physical features of a roadway, information relating to transient anomalies, and transient anomaly locations, among other things. Information relating to features of a route also may include information relating to other vehicles proximate to the motor vehicle. Information relating to another vehicle may include, for example, an indication of the presence of the other vehicle, the geographical location of the other vehicle, the relative location of the other vehicle (e.g., ahead or behind), the distance between the motor vehicle and the other vehicle, and the speed of the other vehicle, among other things. As mentioned above, this information may be received using a vehicle-to-vehicle communication system interface. In addition or alternatively, some or all of this information may be determined using information from a rearward-looking obstacle detection sensor and/or a forward-looking obstacle detection sensor (e.g., sensors 166, 168, FIG. 1).

In block 226, a determination may be made (e.g., by processing and control subsystem 102, FIG. 1) whether or not one or more "DRL activation criteria" are met. As used herein, the term "DRL activation criteria" means a criteria which, when met, indicates that the DRLs should be set to an activated state or should be allowed to remain in an activated state. As the previously discussed flowchart processes indicate, evaluations of DRL activation criteria are made when the lighting system is in an automatic control mode and when the headlights are not set to an activated state. According to an embodiment, some or all of the criteria discussed in the paragraphs below may be considered to be DRL activation criteria.

According to an embodiment, certain types of navigational features in which ambient lighting conditions are likely to be at a relatively low level may be designated by the system as "low-light navigational features," and a DRL activation criteria may be met when a determination is made that the motor vehicle is approaching or is in proximity to the geographical location of such a low-light navigational feature. Low-light navigational features may include, but are not limited to, tunnels, parking structures, overpasses, and lower levels of stacked roadways, for example. According to an embodiment, this determination is made based on the geographical location of the motor vehicle (e.g., as determined in block 218), the type of low-light navigational feature, and the geographical location of the low-light navigational feature. As discussed previously in conjunction with block 224, the type of feature and the geographical location of the feature may be retrieved (e.g., from data storage 114 or from navigation data storage 148, FIG. 1) or may be acquired from an external source (e.g., from vehicle-to-infrastructure communication system interface 154, and/or navigation system interface 144, FIG. 1). This DRL activation criteria may continue to be met during the period of time when the motor vehicle is in proximity to the low-light navigational feature, and may no longer be met when the motor vehicle is no longer in proximity to the low-light navigational feature.

As used herein, the term "the motor vehicle is approaching or is in proximity to" a feature (e.g., a navigational feature) or other entity (e.g., another vehicle, an area of a particular type of weather, a portion of a route, and so on) means that the motor vehicle is on a roadway that intersects the feature or entity, and either: 1) the geographical location of the motor vehicle coincides with the geographical location of the feature or entity; 2) the geographical location of the motor vehicle is within a pre-determined distance from the feature or entity (or some portion of the feature or entity, such as the mouth of a tunnel or the entrance to a parking garage); or 3) the motor vehicle is predicted to arrive at the feature or entity (or some portion of the feature or entity) within a pre-determined period of time, which time may be determined based on the current speed of the motor vehicle, and the distance between the motor vehicle and the feature or entity. The determination of the distance of the motor vehicle from the feature or entity may be made (e.g., by the processing and control subsystem 102, FIG. 1) based on the determined geographical location of the motor vehicle and the known geographical location of the feature or entity. According to an embodiment, a pre-determined distance may be a distance in a range of about 20 meters to about 1000 meters, although the pre-determined distance may be shorter or longer, in other embodiments. For example, a specific DRL activation criteria may be met when a determination is made that the motor vehicle is approaching the mouth of a tunnel (e.g., the motor vehicle is within a pre-determined distance from the mouth of the tunnel). When the motor vehicle is within the pre-determined distance from the mouth of the tunnel, the DRL activation criteria may be met. This DRL activation criteria may continue to be met during the period of time when the motor vehicle is traveling within the tunnel, and may no longer be met when the motor vehicle exits the tunnel (or at some pre-determined distance from exiting the tunnel).

According to an embodiment, other types of navigational features at which the presence of other vehicles is likely may be designated by the system as "high-traffic navigational features," and another DRL activation criteria may be met when a determination is made that the motor vehicle is approaching or is in proximity to such a high-traffic navigational feature. High-traffic navigational features may include, but are not limited to, certain types of traffic control devices (e.g., stop sign and stop lights), intersections, portions of a route in which two-way traffic may be present, portions of a route in which lanes merge, and portions of a route that pass through urban areas, for example. According to an embodiment, this determination is made based on the geographical location of the motor vehicle (e.g., as determined in block 218), the type of feature corresponding to a high-traffic navigational feature, and the geographical location of the high-traffic navigational feature. As discussed previously in conjunction with block 224, the type of feature and the geographical location of the feature may be retrieved (e.g., from data storage 114 or from navigation data storage 148, FIG. 1) or may be acquired from an external source (e.g., from vehicle-to-infrastructure communication system interface 154, and/or navigation system interface 144, FIG. 1). This DRL activation criteria may continue to be met during the period of time when the motor vehicle is in proximity to the high-traffic navigational feature, and may no longer be met when the motor vehicle is no longer in proximity to the high-traffic navigational feature.

According to an embodiment, yet another DRL activation criteria may be met when a determination is made that the motor vehicle is approaching or is in proximity to a portion of a route with decreased visibility (e.g., hilly terrain, a windy roadway, or an area of inclement weather (e.g., rain, snow, sleet, fog)). According to an embodiment, this determination is made based on the geographical location of the motor vehicle (e.g., as determined in block 218) and the geographical location of the portion of the route with decreased visibility. As discussed previously in conjunction with block 224, the geographical location of the feature may be retrieved (e.g., from data storage 114 or from navigation data storage 148, FIG. 1) or may be acquired from an external source (e.g., from vehicle-to-infrastructure communication system interface 154, and/or navigation system interface 144, FIG. 1). This DRL activation criteria may continue to be met during the period of time when the motor vehicle is in proximity to the portion of the route with decreased visibility, and may no longer be met when the motor vehicle is no longer in proximity to the portion of the route.

According to another embodiment, a determination that the motor vehicle is in proximity to a portion of a route with decreased visibility may be made when the windshield wipers are activated (e.g., when windshield wiper activation state sensor 164 produces an indication that the windshield wipers have been activated). This DRL activation criteria may be met during the period of time when the windshield wipers are activated, and may no longer be met when the windshield wipers are deactivated.

According to an embodiment, yet another DRL activation criteria may be met when a determination is made that another vehicle, referred to herein as a "vehicle of interest," is located in proximity to the motor vehicle. According to an embodiment, "in proximity to the motor vehicle" means within a pre-determined distance (e.g., a distance between about 10 meters and about 300 meters) of the motor vehicle. A "vehicle of interest" may be designated by the system as any vehicle, a vehicle that is traveling along or on the same route as the motor vehicle, a vehicle that is traveling along or on a route that intersects the route upon which the motor vehicle is traveling, a vehicle that is traveling in the same direction as the motor vehicle, a vehicle that is traveling in a different direction (e.g., an opposite or intersecting direction) from the motor vehicle, a vehicle that is ahead of the motor vehicle, and/or a vehicle that is behind the motor vehicle. Information used in determining whether a vehicle of interest is located in proximity to the motor vehicle may include, for example, the geographical location of the motor vehicle, the geographical location of the other vehicle, whether or not the other vehicle may be classified as a "vehicle of interest", and the distance between the motor vehicle and the other vehicle. As discussed previously in conjunction with block 224, this information may be received or retrieved, for example, from a forward-looking obstacle detection sensor (e.g., sensor 168, FIG. 1), a rearward-looking obstacle detection sensor (e.g., sensor 166, FIG. 1), and/or via a vehicle-to-vehicle communication system interface (e.g., interface 152, FIG. 1). This DRL activation criteria may continue to be met during the period of time when the motor vehicle is in proximity to the vehicle of interest, and may no longer be met when the motor vehicle is no longer in proximity to the vehicle of interest.

According to an embodiment, yet another DRL activation criteria may be met when a determination is made that an obstacle (e.g., an obstacle that is identified as or having the characteristics of a pedestrian) is located in proximity to the motor vehicle (e.g., an obstacle that is ahead of or behind the motor vehicle). Information used in determining whether an obstacle is located in proximity to the motor vehicle may include, for example, the geographical location of the motor vehicle, the geographical location of the obstacle, and the distance between the motor vehicle and the obstacle. As discussed previously in conjunction with block 224, this information may be received or retrieved, for example, from a forward-looking obstacle detection sensor (e.g., sensor 168, FIG. 1), a rearward-looking obstacle detection sensor (e.g., sensor 166, FIG. 1), via a person-to-vehicle communication system interface (not illustrated), and/or via a vehicle-to-infrastructure communication system interface (e.g., interface 154, FIG. 1). This DRL activation criteria may continue to be met during the period of time when the motor vehicle is in proximity to the obstacle, and may no longer be met when the motor vehicle is no longer in proximity to the obstacle.

Referring again to FIG. 2, when a determination is made, in block 226, that a DRL activation criteria is not met, then in block 210, the DRLs are set to a deactivated state, or if they already are in a deactivated state, then the deactivated state setting is maintained. The method may then iterate as shown in FIG. 2.

When a DRL activation criteria is met, then in block 214, the DRLs are set to an activated state, or if they already are in an activated state, then the activated state setting is maintained. The method may then iterate as shown in FIG. 2. The method of FIG. 2 may continue until a terminating event occurs. For example, the driver may change the automatic control setting of the lighting system or the vehicle may be turned off.

According to an embodiment, rapid switching of the DRLs on and off may be avoided by maintaining the state of the DRLs as either activated or deactivated for at least some minimum amount of time. For example, upon setting the DRLs into an activated state, the system may require a minimum amount of time to elapse before the DRLs may be set into a deactivated state. Accordingly, for example, the system may initiate a timer when the DRLs have been set into an activated state (e.g., when block 214 is performed), and the system may determine whether the timer has reached or exceeded the minimum amount of time before setting the DRLs into a deactivated state (e.g., in block 210). The minimum amount of time may be, for example, an amount of time in a range of about 5 seconds to about 10 seconds, although the minimum amount of time may be higher or lower, in other embodiments.

As described in detail above, embodiments of methods for controlling the activation and deactivation of DRLs in a motor vehicle include receiving information from one or more non-conventional inputs (e.g., in blocks 204, 216, 220, and 224), and using some or all of that information (e.g., in blocks 212, 222, and 226) to determine whether the DRLs should be in an activated or deactivated state. According to an embodiment, non-conventional inputs may include one or more inputs selected from a group that includes an ambient light sensor (e.g., ambient light sensor 162, FIG. 1), one or more external infrastructure components (e.g., positioning system interface 142, FIG. 1), external source interfaces (e.g., navigation system interface 144, vehicle-to-vehicle communication system interface 152, a person-to-vehicle communication system interface (not illustrated), and vehicle-to-infrastructure communication system interface 154, FIG. 1), obstacle detection sensors (e.g., rearward-looking obstacle detection sensor 166 and forward-looking obstacle detection sensor 168, FIG. 1), and/or a windshield wiper activation state sensor (e.g., sensor 164, FIG. 1).

As the previously discussed flowchart processes indicate, when the lighting system is in an automatic control mode, both the DRLs and the headlights may be set to deactivated states under certain conditions. More particularly, both the DRLs and the headlights may be set to deactivated states when it is determined that no DRL activation criteria is met. According to an embodiment, the DRLs may be set to an activated state only when it is determined that one or more DRL activation criteria are met. This is in contrast to traditional lighting systems, in which the DRLs are constantly activated during times when the headlights are deactivated in the automatic control mode. Because the DRLs may be in an activated state for less than the entire time that the lighting system is in the automatic control mode (and the headlights are deactivated), embodiments may result in reduced energy consumption, and thus increased fuel economy.

Although the various process blocks of FIG. 2 are shown in a particular sequence, it is to be understood that various ones of the process blocks may be performed in parallel with each other, and/or the sequence of the process blocks may be varied without departing from the scope of the inventive subject matter. The foregoing description may refer to system components, elements, nodes or features being "coupled"

together. As used herein, unless expressly stated otherwise, the term "coupled" means that one component/element/node/feature is directly or indirectly joined to (or directly or indirectly communicates with) another component/element/node/feature, and not necessarily mechanically. Thus, although the schematics shown in the figures depict various exemplary arrangements of components/elements/nodes/features, additional intervening components, elements, nodes, features, or devices may be present in other embodiments.

While various embodiments of systems and methods have been presented in the foregoing detailed description, it should be appreciated that a vast number of other variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. A method performed by a lighting system of a motor vehicle for controlling the activation of daytime running lamps (DRLs), the method comprising the steps of:
   receiving inputs from one or more external sources; and
   when the lighting system is set in an automatic control mode and when headlights of the motor vehicle are deactivated, selectively activating and deactivating the DRLs based on a determination of whether the motor vehicle is approaching an upcoming geographical location, wherein the determination is made based on the inputs from the one or more sources external to the vehicle.

2. The method of claim 1, wherein the receiving the inputs comprises:
   receiving signals from a positioning system, and
   wherein the method further comprises:
   determining a current geographical location of the motor vehicle based on the signals received from the positioning system, and
   determining whether the motor vehicle is approaching the upcoming geographical location based on the current geographical location.

3. The method of claim 2, wherein the receiving the inputs further comprises:
   receiving navigational information indicating a geographical location of a navigational feature, and
   wherein selectively activating and deactivating the DRLs comprises
   determining, based on the current geographical location of the motor vehicle and the geographical location of the navigational feature, whether the motor vehicle is approaching the navigational feature; and
   when the motor vehicle is approaching the navigational feature, activating the DRLs.

4. The method of claim 3, wherein the navigational feature is a low-light navigational feature selected from a group that includes a tunnel, a parking garage, an overpass, and a lower level of a stacked roadway.

5. The method of claim 3, wherein the navigational feature is a high-traffic navigational feature selected from a group that includes a traffic control device, an intersection, a portion of a route in which two-way traffic may be present, a portion of a route in which lanes merge, and a portion of a route that passes through an urban area.

6. The method of claim 3, wherein the navigational feature is a portion of the route with decreased visibility selected from a group that includes hilly terrain, a windy roadway, and an area of inclement weather.

7. The method of claim 1, wherein the receiving the inputs comprises:
   receiving information indicating that another vehicle is in proximity to the motor vehicle, and
   wherein selectively activating and deactivating the DRLs further comprises
   activating the DRLs when the another vehicle is in proximity to the motor vehicle.

8. A method performed by a lighting system of a motor vehicle for controlling the activation of daytime running lamps (DRLs), the method comprising the steps of:
   when the lighting system is set in an automatic control mode,
   determining whether a DRL activation criteria is met based on a determination of whether the motor vehicle is approaching an upcoming geographical location, and wherein the determination is made based on inputs form one or more sources external to the motor vehicle; and
   when the DRL activation criteria is met and headlights of the motor vehicle are deactivated, activating the DRLs; and
   when the DRL activation criteria is not met and headlights of the motor vehicle are deactivated, deactivating the DRLs.

9. The method of claim 8, wherein the determining whether the DRL activation criteria is met based on a determination that an ambient light level has fallen below a DRL activation threshold.

10. The method of claim 8, wherein the determining whether the DRL activation criteria is met comprises:
    determining, based on a geographical location of the motor vehicle and a geographical location of a low-light navigational feature, whether the motor vehicle is the geographical location of the low-light navigational feature; and
    when the motor vehicle is approaching the geographical location of the low-light navigational feature, determining that the DRL activation criteria is met.

11. The method of claim 8, wherein the determining whether the DRL activation criteria is met comprises:
    determining, based on a geographical location of the motor vehicle and a geographical location of a high-traffic navigational feature, whether the motor vehicle is the geographical location of the high-traffic navigational feature; and
    when the motor vehicle is approaching the geographical location of the high-traffic navigational feature, determining that the DRL activation criteria is met.

12. The method of claim 8, wherein determining whether the DRL activation criteria is met comprises:
    determining, based on a geographical location of the motor vehicle, whether the motor vehicle is approaching a geographical location of an area of inclement weather; and
    when the motor vehicle is approaching the geographical location of the area of inclement weather, determining that the DRL activation criteria is met.

13. The method of claim 8, wherein the determining whether the DRL activation criteria is met comprises:

determining that the DRL activation criteria is met when information is received which indicates that another vehicle or a pedestrian is in proximity to the motor vehicle.

14. A lighting system of a motor vehicle, the lighting system comprising:
 daytime running lamps (DRLs);
 headlights; and
a processing and control subsystem adapted
 to determine, when the lighting system is set in an automatic control mode, whether a DRL activation criteria is met based on a determination of whether the motor vehicle is approaching an upcoming geographical location, and wherein the determination is made based on inputs form one or more sources external to the motor vehicle,
 to activate the DRLs when the DRL activation criteria is met and the headlights are deactivated, and
 to deactivate the DRLs when the DRL activation criteria is not met and the headlights are deactivated.

* * * * *